(12) United States Patent
Xue

(10) Patent No.: US 8,480,837 B2
(45) Date of Patent: Jul. 9, 2013

(54) SEAMLESS EDGE-SEALING METHOD OF FLUORINE RESIN COATING

(75) Inventor: Yanyan Xue, Zhejiang (CN)

(73) Assignee: Ningbo Superbright Technology Co., Ltd., Ningbo, Zhejinag (CN)

( * ) Notice: Subject to any disclaimer, the term of this patent is extended or adjusted under 35 U.S.C. 154(b) by 32 days.

(21) Appl. No.: 13/143,927

(22) PCT Filed: Jan. 9, 2009

(86) PCT No.: PCT/CN2009/000029
§ 371 (c)(1),
(2), (4) Date: Jul. 9, 2011

(87) PCT Pub. No.: WO2010/078695
PCT Pub. Date: Jul. 15, 2010

(65) Prior Publication Data
US 2011/0277925 A1    Nov. 17, 2011

(51) Int. Cl.
*B29C 47/00* (2006.01)
*B32B 3/02* (2006.01)

(52) U.S. Cl.
USPC ............... 156/244.18; 156/244.11; 156/257; 156/258; 156/293; 156/303.1; 264/249; 264/252; 264/271.1; 428/66.7; 428/81

(58) Field of Classification Search
USPC ............. 156/258, 263, 303.1, 244.18, 304.3, 156/304.4, 257, 293; 428/66.7, 81, 83; 99/450; 264/248, 249, 252, 257, 271.1, 277, 279.1
See application file for complete search history.

(56) References Cited

U.S. PATENT DOCUMENTS

| 1,444,405 | A  | * | 2/1923 | Wagemaker | 428/83 |
| 5,373,986 | A  | * | 12/1994 | Rafferty et al. | 228/206 |
| 6,302,993 | B1 | * | 10/2001 | Smith et al. | 156/306.6 |
| 2008/0284056 | A1 | * | 11/2008 | Duke et al. | 264/209.3 |
| 2009/0261308 | A1 | * | 10/2009 | Hirano et al. | 252/567 |

FOREIGN PATENT DOCUMENTS

| GB | 1426768 A | * | 3/1976 |
| WO | WO 2007023956 A1 | * | 3/2007 |
| WO | PCT/CN2009/000029 | | 9/2009 |

* cited by examiner

*Primary Examiner* — William Bell
(74) *Attorney, Agent, or Firm* — Global IP Services; Tianhua Gu

(57) ABSTRACT

The seamless edge-sealing method of fluorine resin coating comprises following steps: (I) Putting the raw material of fluorine resin into a mold to obtain a cylinder (1) through one of the below ways: First, pressure maintaining and demolding, finally sintering the mold formed casting; Second, mechanical injecting; Third, mechanical vulcanizing; (II) Cutting the cylinder (1) into rings (3) and cutting each ring (3) to form an annular slot (31) on the inner wall of each ring; (III) Cutting a piece of base fabric of fluorine resin coating (2) into the shape adapted for the ring (3), and then stuffing the edge of the cut fabric of fluorine resin coating into the slot (31) of the ring; (IV) After hot-pressing, obtaining a piece of fabric of fluorine resin coating (4).

8 Claims, 3 Drawing Sheets

SEAMLESS EDGE-SEALING METHOD OF FLUORINE RESIN COATING

CROSS REFERENCE TO RELATED PATENT APPLICATION

The present application is the US national stage of PCT/CN2009/000029 filed on Jan. 9, 2009, which claims the priority of the PCT/CN2009/000029 filed on Jan. 9, 2009, which application is incorporated herein by reference.

FIELD OF THE INVENTION

The present invention relates to a kind of seamless edge-sealing method of coating, in particular to a seamless edge-sealing method of fluorine resin coating.

DESCRIPTION OF THE PRIOR ART

The cooking tools used in the cooking industry in America and Europe mostly are metal flat-bottomed pans or metal non-stick pans with non-stick coating (fluorine resin coating). If natural gas or gas is used for heating the cooking food, it is very easy to cause the overheating of the pan bottom, so as to burn the fluorine resin coating and result in the food poisoning as well as affecting the health of the people; besides, the burned pan cannot be used any more, therefore it will waste the resource and influent on the environment. Furthermore, with the rapid development of the household appliances, e.g., microwave oven, toaster, electric oven, etc., it is more convenient for the people to cook food. In order to achieve more healthier, more time-saving, easier to clean, more beautiful and durable cooking appliances, a fabric of fluorine resin coating is born at the right moment, which can be used as a baking mat or an ovenware, and it is equipped with many excellent performances, according it can meet the hygienic standards of the food safety laws of Europe and America, e.g., FDA Certification of America and IFGB Certification of EU.

When the fabric of fluorine resin coating is made into a certain shape, the fabric of fluorine resin coating should be cut firstly, however the cut fabric of fluorine resin coating has a rough edge, and the cut fabric should be used after edge-sealing. The traditional edge-sealing process consists of the following steps:

Firstly, processing the raw material of fluorine resin into long strips of the fluorine resin film, and cutting the fabric of fluorine resin coating into the necessary shape;

Secondly, wrapping each long strip of the fluorine resin film around the fabric of fluorine resin coating with certain shape, and edge-sealing with the rough edge sealed and the long strip of the fluorine resin film connected end to end;

Finally, hot-pressing and obtaining an edge-sealed fabric of fluorine resin coating after.

The process has the following disadvantages: First, the end-to-end connection of each long strip of the fluorine resin film will cause a joint, and due to the force unbalance of the edge-sealing the long strip will disconnect, so, the requirements of manufacturing is very high and the appearance will be influenced; Second, crinkles certainly will be caused at the edge of the fabric of fluorine resin coating during the edge-sealing, more crinkles will occur in case of a circular fabric of fluorine resin coating, these crinkles not only cause the waste of the raw material of fluorine resin, but also disfigure the appearance of the product.

SUMMARY OF THE INVENTION

It is an object of the present invention to provide a seamless edge-sealing method of fluorine resin coating with even force balance for the edge-sealing.

For achieving above stated object, a first seamless edge-sealing method of fluorine resin coating, characterized in comprising following steps:

(I) Putting the raw material of fluorine resin into a mold to obtain a cylinder through one of the below ways:

First, pressure maintaining and demolding, finally sintering the mold formed casting;

Second, mechanical injecting;

Third, mechanical vulcanizing;

(II) Cutting the cylinder into rings and cutting each ring to form an annular slot on the inner wall of each ring;

(III) Cutting a piece of base fabric of fluorine resin coating into the shape adapted for the ring, and then stuffing the edge of the cut fabric of fluorine resin coating into the slot of the ring;

(IV) After hot-pressing, obtaining a piece of fabric of fluorine resin coating with seamless edge-sealing.

For achieving above stated object, a second seamless edge-sealing method of fluorine resin coating, characterized in comprising following steps:

(I) Putting the raw material of fluorine resin into a mold to obtain a cylinder through one of the below ways:

First, pressure maintaining and demolding, finally sintering the mold formed casting;

Second, mechanical injecting;

Third, mechanical vulcanizing;

(II) Cutting the cylinder into rings;

(III) Cutting a piece of base fabric of fluorine resin coating into the shape adapted for the ring, and then placing the cut fabric of fluorine resin coating between two rings stacked up;

(IV) After hot-pressing, obtaining a piece of fabric of fluorine resin coating with seamless edge-sealing.

As a preference, the raw material of fluorine resin is at least one of PTFE, PFA, FEP and ETFE with the molecular weight above 12.000.000 and the particle size of 15~50 mu.

In order to keep the color of the edge-sealing consistent with that of the base fabric of fluorine resin coating, as a preference, the raw material of fluorine resin is filled with a high-temperature resistant pigment with the mass percent of 1~5%.

As a preference, before the hot-pressing of Step IV, a fluorine resin adhesive film is filled between the cut fabric of fluorine resin coating and the ring, and the temperature of the hot-pressing is within 200~300° C. Preferably, the fluorine resin adhesive film refers to PFA or FEP.

In order to melt the raw material of fluorine resin in the slot of the ring or adjacent the ring to form glue, as a preference, in Step IV, the temperature of the hot-pressing is within 330~400° C. Accordingly, it is unnecessary to fill with the fluorine resin adhesive film between the cut fabric of fluorine resin coating and the ring.

As a preference, the axial thickness of each ring is within 0.1~0.3 mm.

As a preference, when the cylinder is obtained through the first way in Step I, the nominal pressure for pressure maintaining is in 200~300 kg/cm$^2$.

Compared with the prior art, in this present invention, as the raw material of fluorine resin is manufactured into necessary rings in advance, the product of the fabric of fluorine resin coating has no seams after edge-sealing with the ring, it is difficult for the edge to disconnect with the base fabric of fluorine resin coating due to the force balance when edge-sealing, and the requirement of the process is very low too. In the meanwhile, the manufacture has no crinkles, no seams and no joints, therefore, the appearance of the product is very neat and beautiful. Due to no crinkles, the material quantity can be reduced and the manufacturing cost becomes lower.

Besides, the whole process is simple and the production efficiency is high, and the product quality is stable.

DETAILED DESCRIPTION OF THE INVENTION

To enable a further understanding of the innovative and technological content of the invention herein, refer to the detailed description of the invention and the accompanying drawings below:

FIGS. 1~5 show a first embodiment of the present invention.

Figure 1:
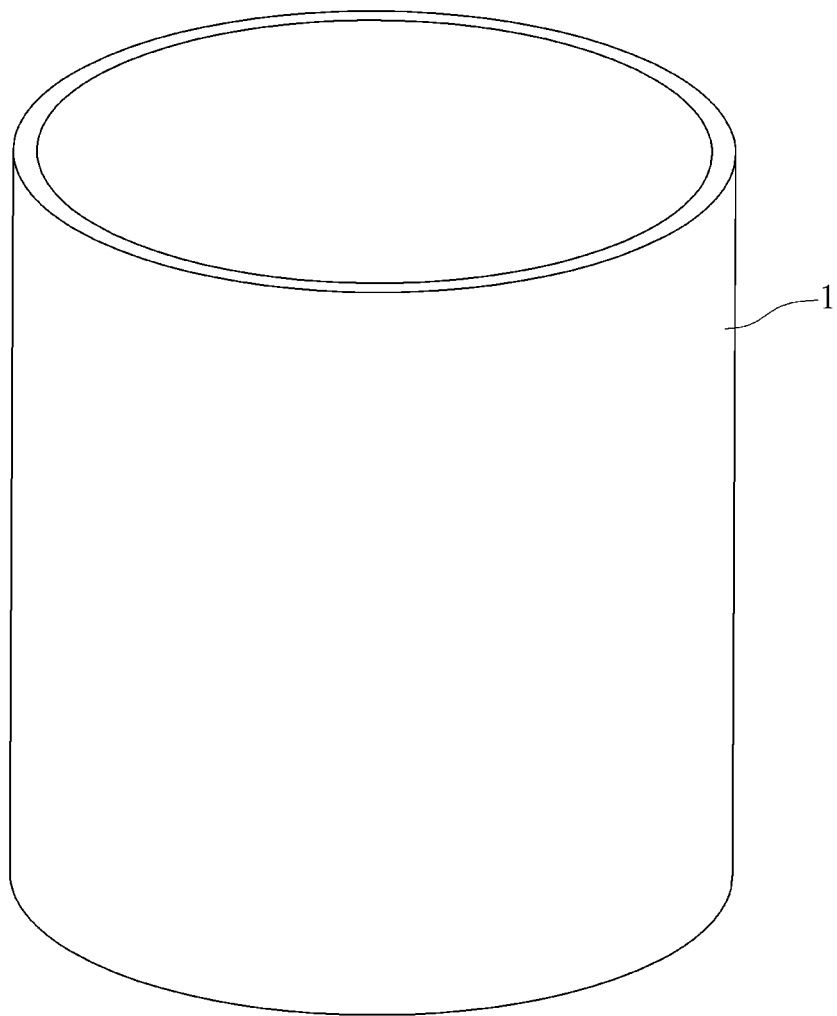
FIG. 1 is a perspective view of a cylinder made from the raw material of fluorine resin in accordance with the first embodiment of the present invention.
Figure 2:
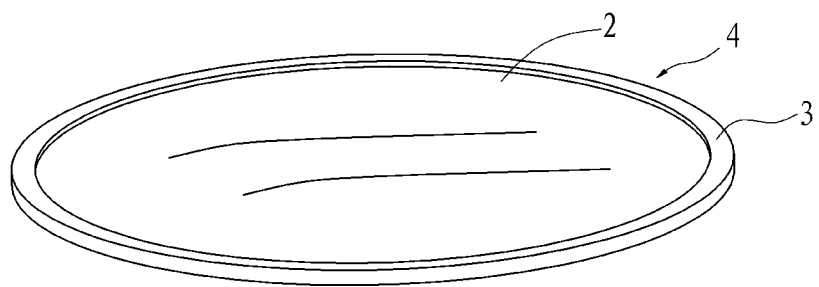
FIG. 2 is a perspective view of the product in accordance with the first embodiment.
Figure 3:
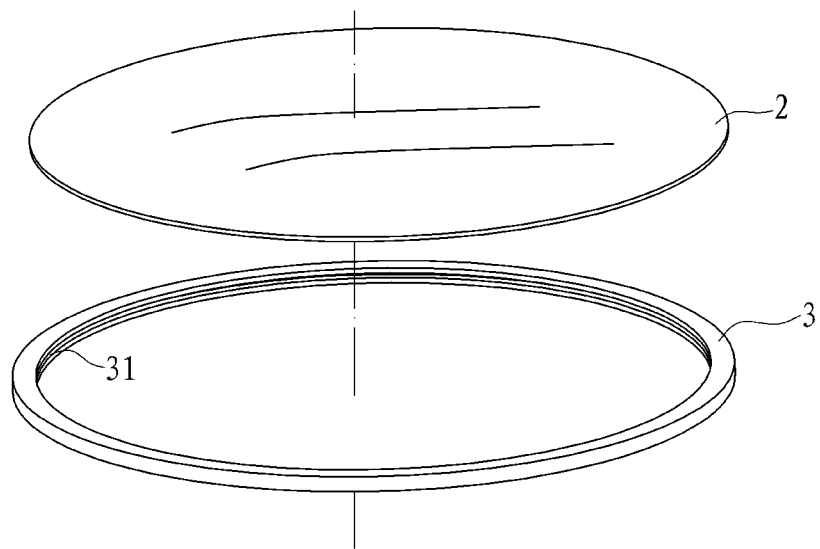
FIG. 3 is an exploded perspective view of the product in accordance with the first embodiment.
Figure 4:
FIG. 4 is a central sectional view of the product in accordance with the first embodiment.
Figure 5:
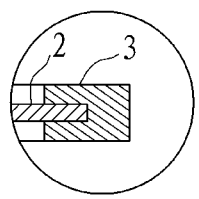
FIG. 5 is an enlarged drawing of Part-A in FIG. 4.

In this embodiment, the seamless edge-sealing method of fluorine resin coating comprises following steps:

(I) Putting the raw material of fluorine resin into a mold to obtain a cylinder 1 through one of the below ways, as shown in FIG. 1, and the raw material of fluorine resin is filled with a high-temperature resistant pigment with the mass percent of 1~5% the color of which is the same as the base fabric of fluorine resin coating 2:

First, pressure maintaining and demolding, finally sintering the mold formed casting, wherein the nominal pressure for pressure maintaining is in 200~300 kg/cm$^2$;

Second, mechanical injecting;

Third, mechanical vulcanizing;

(II) Cutting the cylinder 1 into rings 3, the axial thickness of each ring is within 0.1~0.3 mm, and cutting each ring 3 to form an annular slot 31 on the inner wall of each ring 3, as shown in FIG. 3;

(III) Cutting the base fabric of fluorine resin coating 2 into the shape adapted for the ring 3, and then stuffing the edge of the cut fabric of fluorine resin coating into the slot 31 of the ring 3, as shown in FIG. 3;

(IV) Hot-pressing, the temperature of the hot-pressing is within 330~400° C., so as to melt the raw material of fluorine resin in the slot 31 of the ring 3 to form glue, finally obtaining a piece of fabric of fluorine resin coating 4 with seamless edge-sealing.

The raw material of fluorine resin is at least one of PTFE, PFA, FEP and ETFE with the molecular weight above 12.000.000 and the particle size of 15~50 mu.

Besides, before the hot-pressing of Step IV, a fluorine resin adhesive film can be filled between the cut fabric of fluorine resin coating and the ring, and the temperature of the hot-pressing is within 200~300° C., the fluorine resin adhesive film refers to PFA or FEP.

Figure 6:
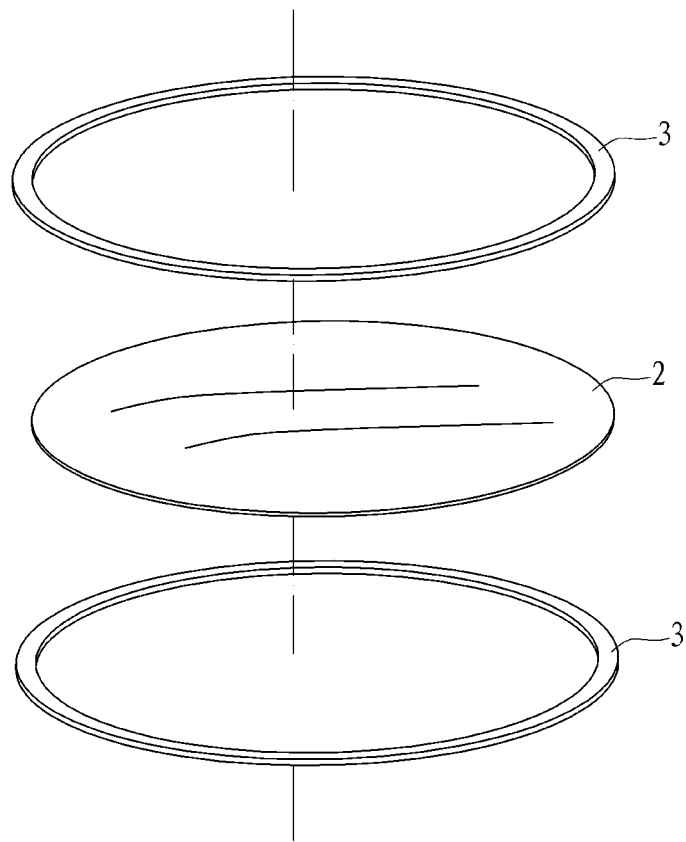
FIG. 6 is an exploded perspective view of the product in accordance with the second embodiment of the present invention.
Figure 7:
FIG. 7 is a central sectional view of the product in accordance with the second embodiment.
Figure 8:
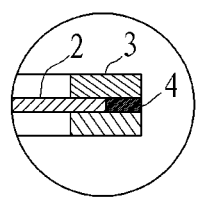
FIG. 8 is an enlarged drawing of Part-B in FIG. 7.

FIG. 6, FIG. 7 and FIG. 8 show a second embodiment of the present invention.

In this embodiment, the seamless edge-sealing method of fluorine resin coating comprises following steps:

(I) Putting the raw material of fluorine resin into a mold to obtain a cylinder 1 through one of the below ways, as shown in FIG. 1, and the raw material of fluorine resin is filled with a high-temperature resistant pigment with the mass percent of 1~5% the color of which is the same as the base fabric of fluorine resin coating 2:

First, pressure maintaining and demolding, finally sintering the mold formed casting, wherein the nominal pressure for pressure maintaining is in 200~300 kg/cm$^2$;

Second, mechanical injecting;

Third, mechanical vulcanizing;

(II) Cutting the cylinder 1 into rings 3, the axial thickness of each ring is within 0.1~0.3 mm, as shown in FIG. 6;

(III) Cutting the base fabric of fluorine resin coating 2 into the shape adapted for the ring 3, and then placing the cut fabric of fluorine resin coating 2 between two rings 3 stacked up, as shown in FIG. 7 and FIG. 8;

(IV) Hot-pressing, the temperature of the hot-pressing is within 330~400° C., so as to melt the raw material of fluorine resin between two rings 3 to form glue, finally obtaining a piece of fabric of fluorine resin coating 4 with seamless edge-sealing.

Before the hot-pressing of Step IV, a fluorine resin adhesive film 4 can be filled between the cut fabric of fluorine resin coating and the ring, as shown in FIG. 8, and the temperature of the hot-pressing is within 200~300° C., the fluorine resin adhesive film 4 refers to PFA or FEP.

The raw material of fluorine resin can be following raw materials:

U.S.A DUPONT: PTEE series refer to 7A, 701N, NXT-75 and NXT-85; FEP series refer to G3, G7, 100, 140 and 160; PFA series refer to 350, 44HP, 940HP, including fluororubber series and ETEE series.

Japan Daikin: PTEE, e.g., M series and MG series; PFA, e.g., AP series, AC series and AF series; FEP, e.g., NP series, ND series, NC series and NF series, including fluororubber series and ETEE series.

Germany 3M Dyneon: PTEE, e.g., TF series, TFM series and THV series; PFA series, e.g., 6900N; FEP series, e.g., 6910, including fluorine resin series and ETEE series.

Italy LDPE: PTEE: F series, S series, L series, GL series, CAR series, GR series, BZ series, INOX series, CER series and MOS series, including PFA series, FEP series and fluororubber series.

Domestic PTEE raw materials:

Sichuan Sunplas: CGM-01, CGM-01-B, CGM-021-BJX-1, CGM-021-BJX-ORS, CGM-16F, CGM-011 and CGM-011AP; fluororubber series: 1#, 2#, 3# and 4#.

Shandong Dongyue: DF-101, DF-102, DF-16A, DF-17A and DF-16A-1; FEP series: DS-602, DS-600; fluororubber series: DS-2601, DS-2602, DS-2603 and DS-2604.

The domestic PTEE raw materials include: the products manufactured by Shanghai 3F, Jiangsu Meilan Chemical Co., Ltd. and Zhejiang Quzhou Chemical Co., Ltd.

The high-temperature resistant pigment can be the imported pigment with the resistance of high temperature of 350~400° C. manufactured by Germany BASF, or Degussa, or Merck, or Swiss Ciba, or U.S.A Ebonex, etc. The domestic products can refer to Pigment Yellow of Model PY-162 and YE-802, Pigment Brown of Model PBR-24, BR-602, etc. which are manufactured by Nanjing Pigment Tech. Co., Ltd., or F-280 manufactured by Wujiang Futai Chemical Science and Technology Co., Ltd., or red pigments of Model 122, 185 and 254 manufactured by Wenzhou Best Fine Pigments Co., Ltd.

What is claimed is:

1. A seamless edge-sealing method of fluorine resin coating comprising following steps:
   (I) putting raw material of fluorine resin which is at least one selected from PTFE, PFA, FEP and ETFE into a mold to obtain a cylinder through one of following ways:
   a, pressure maintaining and demolding, finally sintering a casting formed by the mold;
   b, mechanical injecting;
   c, mechanical vulcanizing;
   (II) cutting the cylinder into rings and cutting an annular slot on an inner wall of each ring;
   (III) cutting a piece of base fabric coated with fluorine resin which is at least one selected from PTFE, PFA, FEP and ETFE into a shape adapted for the ring, and then press the edge of the cut fabric coated with fluorine resin into the slot of the ring;
   (IV) After hot-pressing, obtaining a piece of fabric of fluorine resin coating with seamless edge-sealing.

2. The seamless edge-sealing method of fluorine resin coating of claim 1, wherein the raw material of fluorine resin has a molecular weight above 12.000.000 and a particle size of 15~50 mu.

3. The seamless edge-sealing method of fluorine resin coating of claim 1, wherein the raw material of fluorine resin is filled with a high-temperature resistant pigment with a mass percent of 1~5%.

4. The seamless edge-sealing method of fluorine resin coating of claim 1, wherein before the hot-pressing of Step IV, a fluorine resin adhesive film is filled between the cut fabric coated with fluorine resin and the ring, and the temperature of the hot-pressing is within 200~300° C.

5. The seamless edge-sealing method of fluorine resin coating of claim 4, wherein the fluorine resin adhesive film is PFA or FEP.

6. The seamless edge-sealing method of fluorine resin coating of claim 1, wherein in the Step IV, the temperature of the hot-pressing is within 330~400° C., the raw material of fluorine resin in the ring is melted as glue.

7. The seamless edge-sealing method of fluorine resin coating of claim 1, wherein an axial thickness of each ring is within 0.1~0.3 mm.

8. The seamless edge-sealing method of fluorine resin coating of claim 1, wherein when the cylinder is obtained through the first way in Step I, the nominal pressure for pressure maintaining is in 200~300 kg/cm$^2$.

* * * * *